United States Patent
Mandalia et al.

(10) Patent No.: US 7,542,916 B2
(45) Date of Patent: Jun. 2, 2009

(54) QUEUE BUSTING THROUGH ASSIGNMENT OF KIOSKS TO USERS

(75) Inventors: Baiju D. Mandalia, Boca Raton, FL (US); Joseph G. Rusnak, Durham, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 11/198,459

(22) Filed: Aug. 5, 2005

(65) Prior Publication Data

US 2007/0033111 A1 Feb. 8, 2007

(51) Int. Cl.
G06F 9/46 (2006.01)
G06Q 99/00 (2006.01)
(52) U.S. Cl. ............................................. 705/9; 705/8
(58) Field of Classification Search ................... 705/8, 705/9, 500; 379/210.01
See application file for complete search history.

(56) References Cited

U.S. PATENT DOCUMENTS

| | | | |
|---|---|---|---|
| 6,222,536 B1 | 4/2001 | Kihl et al. | |
| 6,385,652 B1 | 5/2002 | Brown et al. | |
| 6,519,576 B1 | 2/2003 | Freeman | |
| 6,721,783 B1 | 4/2004 | Blossman et al. | |
| 7,200,210 B2 * | 4/2007 | Tang | 379/93.15 |
| 7,305,352 B2 * | 12/2007 | Ikezawa et al. | 705/10 |
| 7,315,823 B2 * | 1/2008 | Brondrup | 705/1 |
| 7,417,663 B2 * | 8/2008 | Yang et al. | 348/14.09 |
| 2001/0007332 A1 | 7/2001 | Kjonaas et al. | |
| 2001/0056401 A1 | 12/2001 | Tompkins | |
| 2002/0188565 A1 | 12/2002 | Nakamura et al. | |
| 2002/0188674 A1 | 12/2002 | Brown et al. | |
| 2003/0097331 A1 | 5/2003 | Cohen | |
| 2003/0101116 A1 | 5/2003 | Rosko et al. | |
| 2003/0163358 A1 * | 8/2003 | Omori | 705/8 |
| 2003/0208386 A1 * | 11/2003 | Brondrup | 705/5 |
| 2004/0008832 A1 * | 1/2004 | Mashimo et al. | 379/210.01 |
| 2005/0203809 A1 * | 9/2005 | Stone et al. | 705/27 |
| 2006/0120307 A1 * | 6/2006 | Sahashi | 370/259 |
| 2007/0019617 A1 * | 1/2007 | Hancock et al. | 370/352 |
| 2007/0036320 A1 * | 2/2007 | Mandalia et al. | 379/210.01 |

OTHER PUBLICATIONS

Anon., "Take a Break North, South, East, NatWest," Daily Mail, p. 21, Jan. 11, 1995.*
Chiranky, L., "Customer Advocacy Paradigm: the Bonnie Button and Beyond," Telemarketing & Call Center Solutions, vol. 15, No. 7, p. 98, Jan. 1997.*
Chiranky, L., "Web Power: Taking Call Centers to New Dimensions," Telemarketing & Call Center Solutions, vol. 15, No. 7, p. 96, Jan. 1997.*
Gee, P., "Thyron Nails Its Colours to the M-Payments Mast," Cards International, p. 12, Jul. 16, 2001.*

* cited by examiner

Primary Examiner—Nicholas D Rosen
(74) Attorney, Agent, or Firm—Cuenot & Forsythe, L.L.C.

(57) ABSTRACT

A method of queue busting using a wireless computing device can include executing a portlet within a wireless computing device, wherein the portlet is configured to query for kiosk availability and receiving a request to reserve a kiosk for use by a customer from the wireless computing device. The wireless computing device can be local to the kiosk. The method further can include determining availability of the kiosk according to scheduling information for the kiosk and reserving the kiosk for use by the customer for a period of time according to the step of determining availability of the kiosk. A message, which specifies reservation information, can be sent to the wireless computing device or a representative scheduled to communicate with the customer through the kiosk. A characteristic of the kiosk can be automatically configured and a communication session with the kiosk can be established.

3 Claims, 2 Drawing Sheets

QUEUE BUSTING THROUGH ASSIGNMENT OF KIOSKS TO USERS

BACKGROUND

1. Field of the Invention

The present invention relates to pervasive computing and, more particularly, to reserving and/or assigning kiosks for use by customers of an organization.

2. Description of the Related Art

Communication technology is advancing at a rapid pace. One notable advance has been the convergence of voice and data communications. To some degree, both voice and data now can be carried over a single network. Convergence has lead to the development of unified systems which are capable of sending and receiving messages over a variety of different communication channels, referring to different forms of communication such as electronic mail, paging, facsimile, instant messaging, telephony, and the like. For example, when a sending user attempts to contact a target individual, a message from the sender can be transmitted over one or more of these communication channels.

Within such messaging systems, a communication channel often is selected according to a profile associated with the target user. For example, a profile can specify that messages sent through the messaging system to the target user should be forwarded as electronic mails on Mondays or as facsimiles on Tuesdays. One can see that the flexibility afforded by such messaging systems can significantly increase the effectiveness of communications within an organization.

To date, however, these capabilities have not been successfully integrated into the routine business processes performed within an organization. Conventional messaging systems have not been used within organizations in a proactive manner which complements or supports customer service. Accordingly, it would be beneficial to provide a system which actively supports and fosters customer service activities within a business and/or organization.

SUMMARY OF THE INVENTION

The present invention provides a solution for assigning and/or reserving kiosks for use by customers of an organization. One embodiment of the present invention can include a method of queue busting using a wireless computing device. The method can include executing a portlet within the wireless computing device, wherein the portlet is configured to query for kiosk availability. A request to reserve a kiosk for use by a customer can be received from the wireless computing device. The wireless computing device can be local to the kiosk. The method further can include determining availability of the kiosk according to scheduling information for the kiosk and reserving the kiosk for use by the customer for an activity for a period of time according to the step of determining availability of the kiosk. The method also can include selecting a representative according to availability of the representative during the period of time for which the kiosk is reserved, according to context information for the representative, and a correspondence between an attribute of a profile of the representative and an attribute of a profile of the customer. A notification can be sent to the representative over a communication channel selected from a plurality of communication channels according to the context information for the representative, wherein the notification indicates that a meeting has been scheduled with the customer via the kiosk. The method further can include automatically configuring at least one characteristic of the kiosk responsive to the activity for which the kiosk was reserved and establishing a communication session between a device of the representative and the kiosk over a communication channel during approximately the period of time for which the kiosk is reserved. The method also can include sending a message to the wireless computing device which specifies reservation information.

Another embodiment of the present invention can include a method of assigning kiosks to customers of an organization including receiving a request to reserve a kiosk for use by a customer from a wireless communication device, determining availability of the kiosk, and selecting a representative according to a correspondence between an attribute of a profile of the representative and an attribute of a profile of the customer. The method can include determining availability of the representative according to context information for the representative and reserving the kiosk for a period of time for use by the customer according to availability of the kiosk and availability of the representative. A notification can be sent to the representative indicating that a meeting has been scheduled with the customer via the kiosk and at least one characteristic of the kiosk can be automatically configured responsive to the request to reserve the kiosk. A communication session between a device of the representative and the kiosk can be established over a communication channel selected from a plurality of communication channels according to context information for the representative. The communication session can be established over the selected communication channel during approximately the period of time for which the kiosk is reserved.

Another embodiment of the present invention can include a method of assigning kiosks to customers of an organization including receiving a request to reserve a kiosk for use by a customer from a wireless communication device, determining availability of a kiosk, and determining availability of a representative according to context information for the representative. The method further can include reserving the kiosk for a period of time for use by the customer according to availability of the kiosk and availability of the representative.

Yet another embodiment of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a solution for assigning kiosks to customers of an organization for use in conducting business transactions or in providing training. In accordance with the inventive arrangements disclosed herein, an on-site representative can identify customers in need of assistance or that are conducting selected types of business transactions which can be handled through a kiosk. The on-site representative effectively attempts to reduce lines and wait times within the premises of the organization by facilitating the use of kiosks also located on premises. To reserve a kiosk, the availability of the kiosk can be checked. If available, the kiosk can be reserved for the customer. The customer can begin to use the kiosk without assistance or with assistance from a different representative through a communication channel established with the kiosk. Assistance provided to the customer via the kiosk can be provided by a representative that is remotely located from the kiosk.

As used herein, a kiosk can be implemented as an information processing appliance having communication capabilities. In one embodiment, the kiosk can include a computer system having the necessary input and output devices for providing access to various communication channels. Thus, the kiosk can include audio input and output devices, video input and output devices, a keyboard, whether physical or virtual, a pointing device such as a mouse, stylus, and/or touch screen. Accordingly, the kiosk can be used by customers to access instant messaging (IM), telephony services, whether Internet Protocol (IP) based or conventional, wireless communications, or videoconferencing. The kiosk further can be used to access various systems to be described herein via a data communications link as well as execute various application programs.

Figure 1:
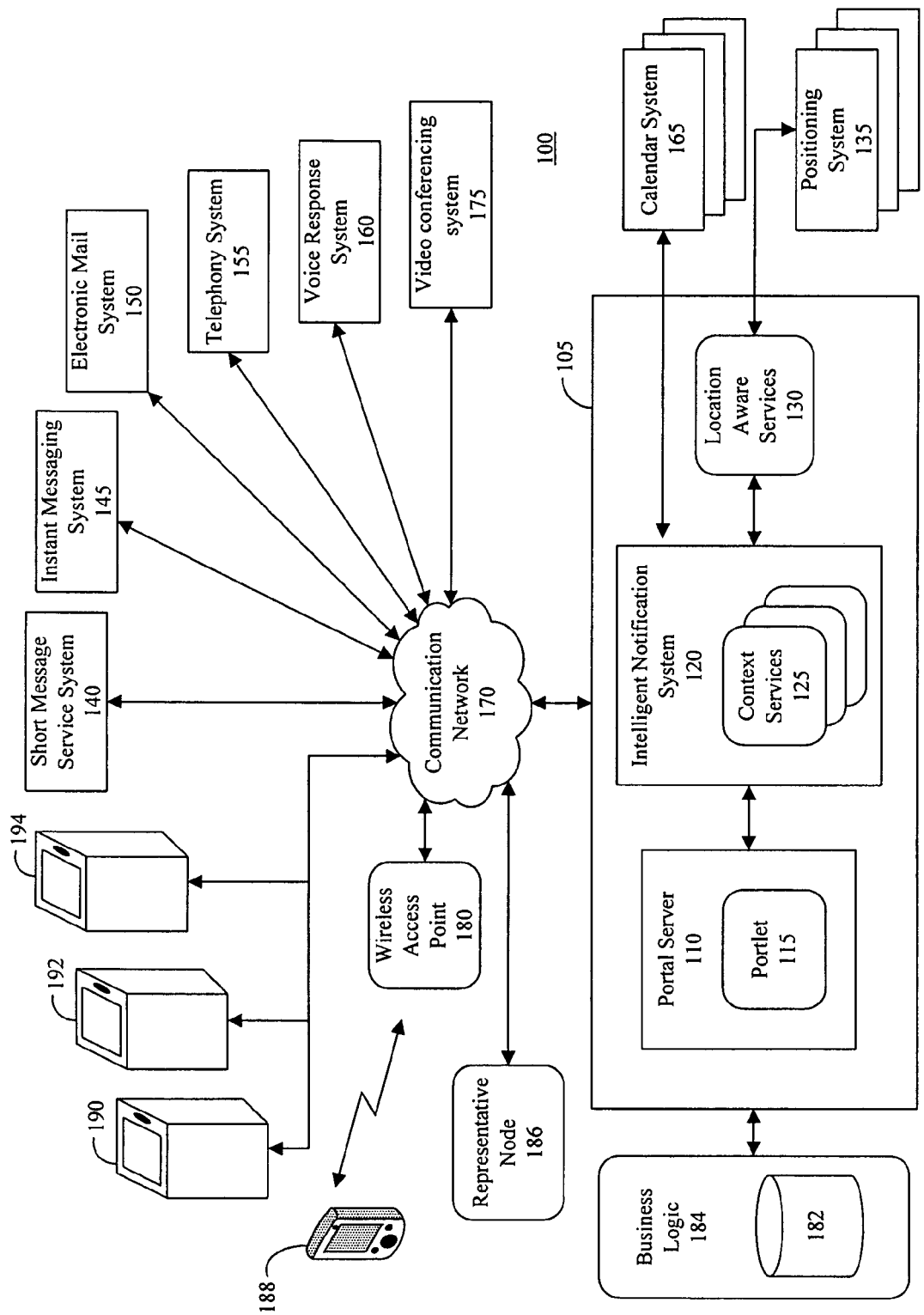
FIG. 1 is a block diagram illustrating a system for assigning kiosks to customers of an organization in accordance with one embodiment of the present invention.

FIG. 1 is a block diagram illustrating a kiosk reservation system 100 in accordance with one embodiment of the present invention. The kiosk reservation system 100 can be used in the context of queue busting, where customer service personnel work to alleviate customer lines and wait times. Accordingly, the system 100 can include an on-demand computing environment (computing environment) 105 for providing applications to mobile users. Computing environment 105 can be configured as a middleware platform that provides an integrated client-server environment and application development tools to extend business applications and data to mobile devices. Computing environment 105 provides the back-end integration framework necessary for providing functions including, but not limited to, mobile personal information management, electronic mail synchronization, and access to World Wide Web (Web) based and other content.

In one embodiment, computing environment 105 can be implemented as WebSphere® Everyplace Access, which is commercially available from International Business Machines Corporation of Armonk, N.Y. (IBM). WebSphere® Everyplace Access is described in greater detail in the following publications, which are incorporated herein by reference: IBM WebSphere Everyplace Access V5 Handbook for Developers and Administrators, Volume IV: Advanced Topics, IBM (March 2005); IBM WebSphere Everyplace Access V5 Handbook for Developers and Administrators, Volume II: Application Development, IBM (March 2005); and Adding Voice to your Portlet Applications, IBM (July 2004). In any case, the use of a particular computing environment 105 is not intended to limit the scope of the present invention.

The computing environment 105 can include a portal server 110, an intelligent notification system (INS) 120, and location aware services 130. The portal server 110 provides a simple, unified access point through which a variety of functions can be accessed. Although the term "portal" can be used in reference to Web-based applications, this need not be the case. The portal server 110 can be implemented as an application that provides content and/or functionality aggregation regardless of whether the Web or markup language(s) are used. For example, in one embodiment, the portal server 110 can be implemented as WebSphere® Portal, which is available from IBM.

The portal server 110 can include one or more portlets 115. Each portlet 115 can serve as a reusable software component which can execute within the portal server 110. Each portlet 115 can be considered a complete application which can follow a standard model-view-controller design. Further, each portlet 115 can have multiple states and view modes, as well as event and messaging capabilities. Portlets 115 can be accessed visually, via a graphical user interface, or by voice.

In illustration, one portlet 115 can provide a function such as document searching, another can provide user login and/or security, and another can serve as an electronic mail client. With respect to the present invention, a portlet 115 can be provided which allows an on-site representative to determine availability for kiosks 190, 192, and 194 based upon context information for the kiosks. Other portlets 115 can be programmed to obtain context information from the INS 120 and compute and/or provide employee availability information based upon that context information. The portlet 115 further can trigger one or more notifications or actions, such as scheduling an employee for a virtual meeting or teleconference with a customer at one of the kiosks 190-194.

In general, the INS 120 collects context information from any of a plurality of different sources. This allows enterprises to send messages to mobile users to improve information flow and business efficiency. Context services 125 are disposed within the INS 120. The context services 125 can acquire and analyze context information relating to the availability of users and make this information available to the INS 120 and other components of system 100 that may have a need to use such information.

As used herein, context information can include, but is not limited to, information relating to one or more individuals as may be acquired from any combination of location aware services 130, a calendar system 165, positioning systems 135, and presence-providing systems such as instant messaging (IM) system 145 and/or a telephony system 155, which can be implemented as an Internet Protocol (IP) telephony system. Context information also can be provided from Short Message Service (SMS) system 140, which can be implemented as a Wireless Application Protocol (WAP) based system, electronic mail system 150, and video conferencing system 175. With respect to the messaging systems 140-155 and 175, for example, the context services 125 can be configured to communicate with presence servers through appropriate communication protocols such as SIP for Instant Messaging and Presence Leveraging Extensions (SIMPLE) for communication with an IM system 145 presence server, Parlay for communicating with a telephony system 155 presence server, and the like.

It should be appreciated that the listing of systems from which context information can be derived is not intended to be exhaustive. As such, the list serves only as an example of some of the different types of systems that can be used in conjunction with the INS 120 and from which context information can be obtained for purposes of determining availability of an individual and/or kiosk. For example, other means of determining context information can include, but are not limited to, providing a network-connected application that users can use to manually toggle availability from available to not available similar to IM system 145. Workstation agents can be used which detect activity on the workstation and the type of activity that is taking place on the workstation such as the particular application being used, whether a Web conference is ongoing, and the like. Motion and/or sound detectors also can provide context information. Other examples of context information and applications thereof can be found within J. Fogarty and S. Hudson, *Examining the Robustness of Sensor-*

*Based Statistical Models of Human Interruptibility*, CHI 2004, Apr. 24-29, 2004, Vienna, Austria, which is incorporated herein by reference.

In any case, the INS 120 can interact with different messaging systems such as SMS system 140, IM system 145, electronic mail system 150, telephony system 155, voice response system 160, and video conferencing system 175. The INS 120 can instruct the various messaging systems to send messages, interpret user response data received from the messaging systems, as well as implement the communications capabilities between these systems and the location aware services 130.

For example, a context service 125 can be provided which polls the IM system 145 to determine whether a particular user is logged onto the IM system 145. The context service 125 further can be tasked with communicating with the IM system 145 to command the IM system 145 to send a communication, i.e. an instant message, as well as interpret data received from the IM system 145 such as user responses. In another example, a context service 125 can be provided which can query the calendar system 165. The context service 125 can be configured to interact with the calendar system 165 to obtain scheduling information for selected user(s) and/or kiosks 190, 192, and/or 194 contained therein.

In yet another example, the INS 120 can interact with the voice response system 160 and instruct it to perform various functions. Voice response system 160 can perform functions such as placing telephone calls via telephone system 155 and conducting dialogs with a call recipient. Accordingly, the voice response system 160 can provide functions including, but not limited to, executing applications such as Voice Extensible Markup Language (VoiceXML) applications, playing recorded prompts, prompting users through text-to-speech technology, speech recognizing user spoken utterances, and recognizing dual tone multi-frequency (DTMF) input. These capabilities can be used to supply interactive voice response functions for telephone calls conducted over telephony system 155.

In one embodiment, the voice response system 160 can be implemented as, or include, WebSphere® Voice Response, WebSphere® Voice Application Access, and WebSphere® Voice Server, each being available from IBM. WebSpheree Voice response provides telephony connectivity to WebSphere® voice applications, which can be executed therein. WebSphere® Voice Server provides text-to-speech functionality and automatic speech recognition functions. WebSphere® Voice Application Access provides rendering of voice to WebSphere® Portal applications such as portlets 115.

Users can subscribe to services set up by a system administrator, and receive timely, personalized alerts through the INS 120. The INS 120 allows users to subscribe to events and to specify an action to be taken when a match is found between a subscription and an event that is passed to the INS 120. For example, the communication capabilities of the INS 120 can be used to notify a user of the occurrence of an event.

Thus, the INS 120 and/or the context services 125 can be configured to perform a variety of different functions relating to context information. Other examples of functions which can be performed by the INS 120 can include collecting, maintaining, and disseminating context information as disclosed in U.S. Patent Publication No. 2003/0018692 entitled "Method and Apparatus for Providing a Flexible and Scalable Context Service"; providing context-aware unified communication for enabling communications between users over a common communications platform or heterogeneous communication platforms as disclosed in U.S. Patent Publication No. 2004/0203664 entitled "System and Method for Context-Aware Unified Communications"; as well as fuse context data for use by context aware applications as disclosed by U.S. Patent Publication No. 2004/0111397 entitled "Method and Apparatus for Fusing Context Data". Each of these patent publications is incorporated herein by reference.

Location aware services 130 provide a framework for integrating real time location information into communications and business applications. In one embodiment, the location aware services 130 provide the functionality and/or interfaces necessary for interacting with various positioning systems 135. Each location aware service 130 can be tasked with communicating with a particular positioning system 135. The positioning systems 135 can include, but are not limited to, short range wireless location tracking systems such as those based upon one of the 802.11 wireless communication protocols, Global Positioning Systems, and the like. In any case, the location aware services 130 can communicate with the various positioning systems 135 to determine whether a particular user, or more particularly mobile user device, is locatable, and if so, the location for that device and corresponding user.

Location aware services 130 also can be organized at a higher level. For example, the location aware services 130 can include services such as geocoding in reference to determining geographical coordinates for an address received as input, reverse geocoding, directory services where points of interest are located proximate to a given location, routing in reference to determining physical directions from one location to another, mapping which provides a map of a designated location, and device positioning which returns a location of a user's device.

Business logic 184 can be implemented as a collection of one or more software applications which implement various business processes and/or functions. Data required by the business logic 184 can be stored within data store 182, for example within a database or other suitable data structure. It should be appreciated, however, that data also can be obtained from, or maintained by, an outside data source. In any case, the various capabilities described herein with respect to presence detection, messaging, and calendaring can be accessed by the business logic 188 via the INS 120 and/or portal server 110. Further, information stored within the business logic 188 and/or data store 182, such as customer and/or user (representative) profiles, can be accessed by the portal server 110.

The system further can include a representative node 186 through which an on-site representative can access the various components of system 100. More particularly, via the representative node 186, an on-site representative can access portlet 115 to check availability of kiosks, locate other representatives using context information, and the like. That is, the portlet 115 can serve as an interface to the INS 120 and the context services 125 contained therein. The representative node 186 can include communication capabilities, similar to the kiosks 190-194, to communicate via any of a variety of the communication channels disclosed herein.

Wireless communication device 188 can be implemented as any of a variety of handheld or portable communication devices having wireless capability. Though the wireless communication device 188 can include long-range wireless capabilities, for example when implemented as a mobile phone, the device also can be implemented to communicate over shorter-range wireless networks such as Bluetooth, one of the 802.11 family of communication protocols, etc. Through the wireless communication device 188 and wireless access point 180, an on-site representative can access the various components of system 100. For example, the on-site representative can access the portlets 115 to query for kiosk and user, or representative, availability. The wireless communication device 188 can download and execute a portlet 115 which provides such functionality. User interactions with the wireless communication device 188 can be visual in nature, audible (voice) commands, or multimodal.

Communication network 170 can include the Internet, the Web, Local Area Networks, Wide Area Networks, the Public Switched Telephone Network, wireless networks whether mobile and/or cellular networks as well as shorter-range wireless networks such as 802.11 type networks, Bluetooth type networks, and the like. It should be appreciated that the particular network architecture used is not intended as a limitation of the present invention.

Figure 2:
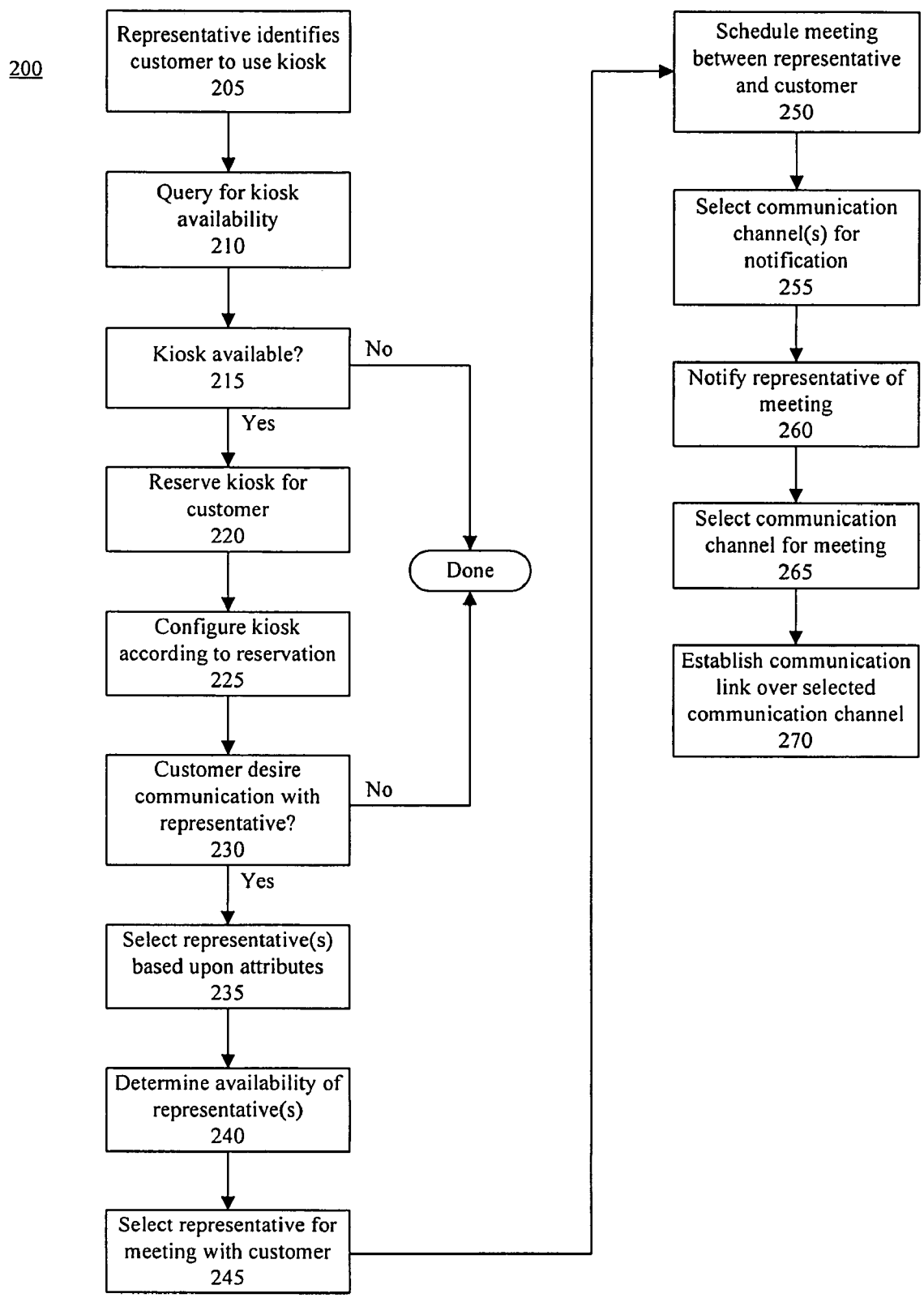
FIG. 2 is a flow chart illustrating a method of scheduling kiosk usage on behalf of customers of an organization in accordance with another embodiment of the present invention.

FIG. 2 is a flow chart illustrating a method 200 of scheduling kiosk usage on behalf of customers of an organization. In one embodiment, the method 200 can be implemented using the system of FIG. 1. As such, one or more kiosks can be provided on premises of an organization. The kiosks can be used by customers to access various services of the organization. Method 200 can begin in a state where an on-site representative, referred to as a queue buster, is mixing among one or more customers on premises of the organization, local to the kiosks. The on-site representative can carry a portable, wireless communication device. Armed with the wireless communication device, the on-site representative can observe customer behavior and other information concerning the quality of customer service being provided by the organization such as the length of customer lines and the amount of time customers tend to wait before being helped. For example, one goal of the customer service representative is to reduce customer wait times and shorten time spent waiting in lines.

Method 200 can begin in step 205, where the on-site representative identifies a customer that can or will use a kiosk. The on-site representative can query customers to identify those that intend to conduct selected business transactions which can be performed through the use of a kiosk. These transactions can be performed through a kiosk either with or without the aid of a representative. In illustration, within a bank, an on-site representative can observe and interact with customers to identify those that have a desire to use a kiosk for performing a banking transaction such as initiating a loan application, withdrawing funds, depositing funds, or the like.

In another example, the on-site representative can identify customers that may require training to use a kiosk or other functions of the organization that can be accessed through a kiosk. Such customers may be apprehensive to use a kiosk due to lack of experience and/or training with such devices. The on-site representative can identify customers that wish to receive training and assign kiosks to those users. The training can be delivered as streaming video, as online Web-based training, or the like. Further, the training can include a live component where the customer interacts with another representative through an established communication session.

In step 210, the on-site representative can query the system for kiosk availability via the wireless communication device and portlet executing therein. It should be appreciated, however, that the query can be initiated via the representative node as well. In any case, either the wireless communication device or the representative node can execute the portlet which allows the on-site representative to issue queries to the system regarding kiosk availability. Though the on-site representative can query the system to determine a kiosk that is immediately available or will be within a short time frame, i.e., within ten minutes or another time period the customer is willing to wait, the on-site representative also can check future availability of the kiosk, i.e., for the next day. In either case, the query can be handled by the portlet which can obtain a response as to availability of one or more of the kiosks located on premises with the on-site representative and customer.

As noted, the portlet can interact with the INS to obtain context information. In this case, the context information for the kiosk can include reservation times for the kiosk(s) obtained from the calendar system via the INS. The context information can specify when the kiosk(s) are available and when the kiosk(s) are reserved. In step 215, a determination can be made as to whether a kiosk, local to the user, is available. If one or more kiosks are available, the method can proceed to step 220. If not, the method can end. If only one kiosk is available, that kiosk can be selected. If more than one kiosk is available, then a kiosk can be selected from a list of available kiosks either by the on-site representative via a portlet interface or automatically by the portlet logic.

In step 220, the on-site representative, working through the wireless device or the representative node, can reserve the kiosk. The on-site representative can access a portlet and select an option or control which causes the kiosk to be reserved. Additional information can be provided from the on-site representative such as the particular date, time, and length of use for the reservation. In addition, the on-site representative can specify the purpose of the customer visit or type of transaction to be performed. In another embodiment, the on-site representative can select an available time from a list of available times. The portlet causes the INS to place an appropriate entry in the calendar system so that the kiosk has a "reserved" or "in use" status for subsequent queries.

The amount of time for which the kiosk can be reserved can vary according to the purpose for which the customer will use the kiosk, i.e., training, a business transaction, etc., as well as the particular training course to be taken or the particular type of transaction to be implemented. While the amount of time for which the kiosk is reserved can be calculated automatically by a portlet based upon information provided by the on-site representative, in another embodiment, the on-site representative can manually specify a reservation duration such as 5 minutes, 10 minutes, a half-hour, etc. In any case, when a reservation is made, the INS can send a message back to the wireless device. The message can specify reservation information which can include, but is not limited to, which kiosk has been reserved for use by the customer, the time of the reservation, and the duration of the reservation.

In step 225, responsive to the reservation, one or more characteristics of the kiosk can be configured automatically according to the particular reservation that is made by the on-site representative. The kiosk can be configured dynamically under the direction of, or responsive to a command from, the portlet executing within the wireless communication device or the representative node as the case may be. For example, a particular application can be loaded into the kiosk, a particular markup language page can be loaded, particular communication channels such as IM, videoconference, teleconference, and the like can be selectively enabled and configured within the kiosk, network connectivity can be configured, and access rights can be set. Thus, if the reservation is for the customer to perform a particular transaction, the kiosk can be configured to perform that transaction. Once the customer logs into the system, the kiosk can be set to go directly to a particular state or transaction screen. If the reservation is for training relating to a particular task or topic, once the customer logs into the system, the kiosk can be queued to play the appropriate training material when instructed to do so by the customer. This allows the kiosk to be configured according to the user's intended use, i.e. training for a particular topic or task, or for performing a particular type of transaction.

In step 230, a determination can be made as to whether the customer wishes to establish a communication session with a different representative through the reserved kiosk. The customer can choose to use the kiosk alone, i.e., without communicating with a representative, or with the aid of a representative. Thus, if the user is using the kiosk for training, the training can be provided in a supervised or unsupervised manner. If the user is using the kiosk to perform a transaction, the customer has the same options, i.e., using the kiosk in a supervised or unsupervised manner.

If the customer wishes to use the kiosk alone, the method can end, as a kiosk has been reserved and is available for use by the customer. If the customer wishes to have a supervised session, whether for training or for performing a transaction, the method can proceed to step 235. The representatives that can be matched to customers for a supervised session can have a level of expertise, as specified in a profile, in particular areas that may be of interest to the customer.

In step 235, one or more representatives can be selected for meeting with the customer. The representative(s) can be selected according to one or more attributes specified in a profile of the representative. In illustration, the business logic and/or data store contained therein, can maintain profiles for different representatives. Each profile can specify training courses that have been completed by the representative, areas of expertise, and the like. Similarly, customers can have profiles specifying the type of business that customer has performed with the organization in the past, any pending or ongoing transactions, as well as other attributes. Further, when querying the customer, the representative can ascertain the reason for the customer's visit to the business. Accordingly, a portlet can be configured to compare attributes from the customer profile with attributes from the profiles of the representatives to determine a correspondence or match.

In step 240, the availability of any identified, or selected, representatives can be determined. Availability can be determined according to context information. As noted, context information can include calendar information, presence information, location information, as well as other sensor information, which when taken collectively, can indicate the availability of the user as well as which communication channel is most likely to be able to reach the user.

In one embodiment, a portlet can be implemented which institutes a policy for interpreting context information. The portlet can resolve conflicting instances of context information and indicate whether the representative is available for a meeting with a customer. In another embodiment, the policy implemented by the portlet can prioritize and/or assign weights to the different types of context information such as calendar, presence, location, or subsets thereof such as IM presence, telephony presence, and the like. For example, presence information can be considered more important than location or calendar information when determining availability. In another example, calendar information can be given the highest priority. This allows administrators to establish policies defining a hierarchy of context information importance which can be used to determine user availability and/or measures of availability as the case may be.

The policies for interpreting context information can vary in complexity in order to resolve ambiguities. For example, a policy can indicate that if a conflict arises between calendar information and presence information, then presence information is used in lieu of calendar information. Thus, if the calendar system indicates that the user is free, but the user does not have a presence on any messaging system, a determination can be made that the user is not available. Similarly, if the calendar system indicates that the user is free, but the user is off-site and does not have a presence on a messaging system, a determination can be made that the user is not available.

It should be appreciated that availability need not be an all or nothing proposition. That is, if the representative is not logged onto his or her computer system, the representative can be considered unavailable for an IM session or a videoconference, but may be available for a teleconference. In any case, availability of representatives can be determined for the time period for which the kiosk is reserved, or is to be reserved.

In step 245, a representative from the group of representatives having the necessary qualifications, and that is available during the time period when the kiosk is reserved for use by the customer, can be selected. In step 250, a meeting between the customer and the representative can be scheduled based upon the representative's availability, i.e., during the time period for which the kiosk is reserved for the customer. The meeting is conducted via a communication channel established between the kiosk to which the customer is assigned and a communication device of the selected representative. Accordingly, communication channels including, but not limited to, IM, videoconferencing, and teleconference can be used. This allows the selected representative to be remotely located from the customer and the kiosk.

In step 255, one or more communication channels can be selected over which the representative can be notified of the meeting. The communication channel(s) can be selected according to the context information for the representative similar to the way in which availability is determined. In step 260, the representative can be notified via the selected communication channel(s). Accordingly, the representative can be sent an IM, an electronic mail, an automated telephone call, a text message, a page, some other variety of message, or any combination thereof. A portlet can select the communication channel and instruct the INS to notify the user via the selected communication channel(s).

In step 265, a communication channel can be selected for use during the meeting between the customer and the representative. In one embodiment, the communication channel used for the meeting can be selected in similar fashion to the way in which the communication channel for the notification was selected. That is, context information for the representative can be used to select the communication channel. The communication channel selected for the meeting may or may not be the same communication channel used to notify the representative. In another embodiment, the communication channel can be selected by the customer. In that case, the selection can be made at the kiosk by via an appropriate portlet or by the customer telling the on-site representative a preferred communication channel to use. The on-site representative, then can specify the communication channel through the portlet executing within the wireless device.

It should be appreciated that further messages can be sent from the INS to the wireless device throughout method 200. Such messages can describe the state of a given reservation, such as which representative is scheduled to meet with the customer and the particular manner or communication channel to be used. This allows the on-site representative to notify the customer of the name of the representative with which the customer will be interacting prior to use of the kiosk.

In step 270, a communication session can be established between a communication device of the representative and the kiosk which has been reserved for use by the customer.

Accordingly, the customer can begin the transaction or training material can be delivered to the customer at the kiosk. The customer can continue the transaction or the training with the guidance and/or assistance of the representative being provided via the selected communication channel through the kiosk.

It should be appreciated that the method 200 is presented for purposes of illustration only. Different ones of the steps can be performed in varying order or in a different manner without departing from the spirit of the present invention. For example, if so desired, information such as availability and whether the representative is qualified can be ascertained on a per representative basis rather than in "batch" form as described herein.

The present invention facilitates kiosk usage by customers in an effort to enhance and improve customer service within an organization. By helping customers access kiosks, customer wait times can be reduced and customer satisfaction increased. Further, the ability to interact with a live representative through the kiosk provides customers with an added incentive to utilize kiosks.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of queue busting using a wireless computing device comprising:
    executing a portlet within a wireless computing device, wherein the portlet is configured to query for kiosk availability;
    receiving a request to reserve a kiosk for use by a customer from the wireless computing device, wherein the wireless computing device is local to the kiosk;
    determining availability of the kiosk according to scheduling information for the kiosk;
    reserving the kiosk for use by the customer for an activity for a period of time according to said step of determining availability of the kiosk;
    sending a message to the wireless computing device which specifies reservation information;
    selecting a representative according to availability of the representative during the period of time for which the kiosk is reserved, according to context information for the representative, and a correspondence between an attribute of a profile of the representative and an attribute of a profile of the customer;
    sending a notification to the representative over a communication channel selected from a plurality of communication channels according to the context information for the representative, wherein the notification indicates that a meeting has been scheduled with the customer via the kiosk;
    automatically configuring at least one characteristic of the kiosk according to the activity for which the kiosk was reserved; and
    establishing a communication session between a device of the representative and the kiosk over a communication channel during approximately the period of time for which the kiosk is reserved.

2. A method of assigning kiosks to customers of an organization comprising:
    receiving a request, from a wireless communication device, to reserve a kiosk for use by a customer;
    determining availability of the kiosk;
    selecting a representative according to a correspondence between an attribute of a profile of the representative and an attribute of a profile of the customer;
    determining availability of the representative according to context information for the representative;
    reserving the kiosk for a period of time for use by the customer according to availability of the kiosk and availability of the representative;
    sending a notification to the representative indicating that a meeting has been scheduled with the customer via the kiosk;
    automatically configuring at least one characteristic of the kiosk responsive to the request to reserve the kiosk; and
    establishing a communication session between a device of the representative and the kiosk over a communication channel selected from a plurality of communication channels according to context information for the representative, wherein the communication session is established over the selected communication channel during approximately the period of time for which the kiosk is reserved.

3. A machine readable storage, having stored thereon a computer program having a plurality of code sections executable by a machine for causing the machine to perform the steps of:
    receiving a request to reserve a kiosk for use by a customer, wherein the request originates from a wireless computing device that is local to the kiosk;
    determining availability of the kiosk according to scheduling information for the kiosk;
    reserving the kiosk for use by the customer for an activity for a period of time according to said step of determining availability of the kiosk;
    sending a message to the wireless computing device which specifies reservation information;
    selecting a representative according to availability of the representative during the period of time for which the kiosk is reserved, according to context information for the representative, and a correspondence between an attribute of a profile of the representative and an attribute of a profile of the customer;
    sending a notification to the representative over a communication channel selected from a plurality of communication channels according to the context information for the representative, wherein the notification indicates that a meeting has been scheduled with the customer via the kiosk;

automatically configuring at least one characteristic of the kiosk according to the activity for which the kiosk was reserved; and establishing a communication session between a device of the representative and the kiosk over a communication channel during approximately the period of time for which the kiosk is reserved.

* * * * *